UNITED STATES PATENT OFFICE.

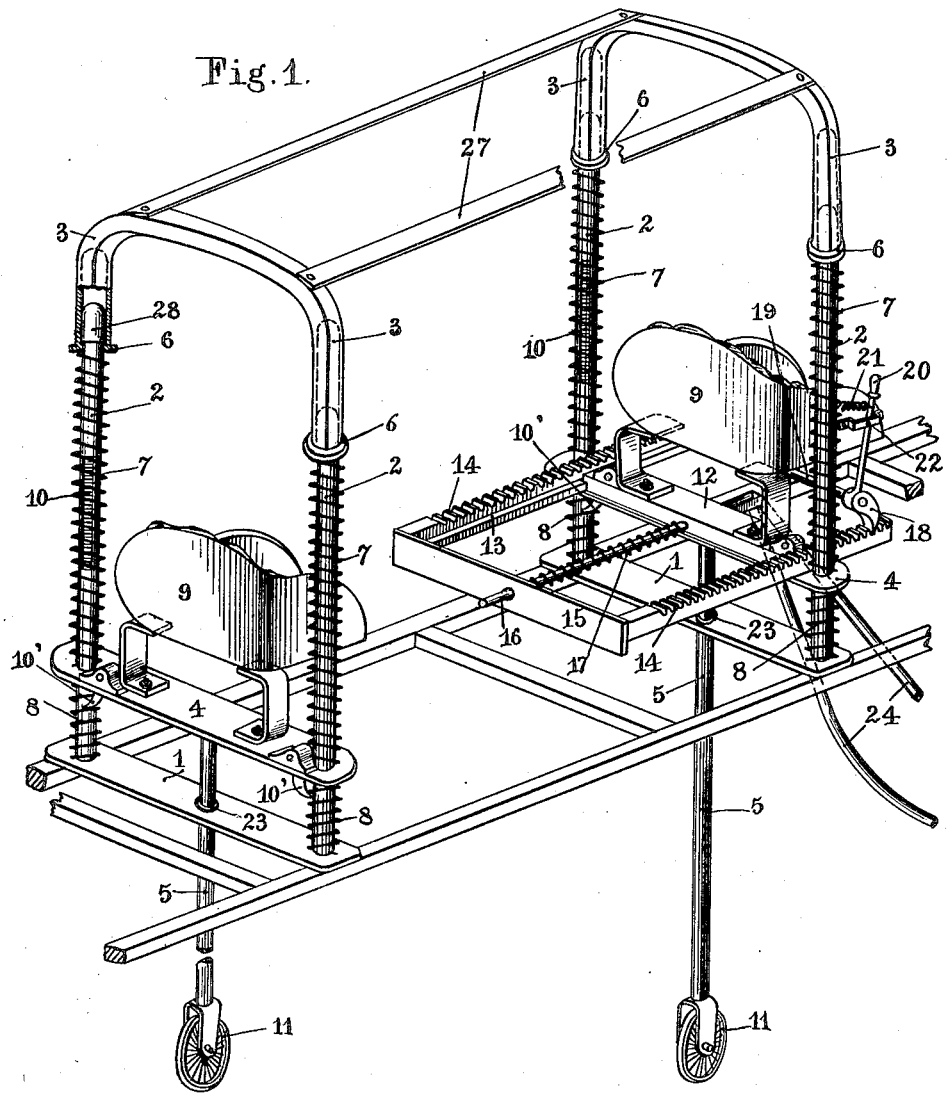

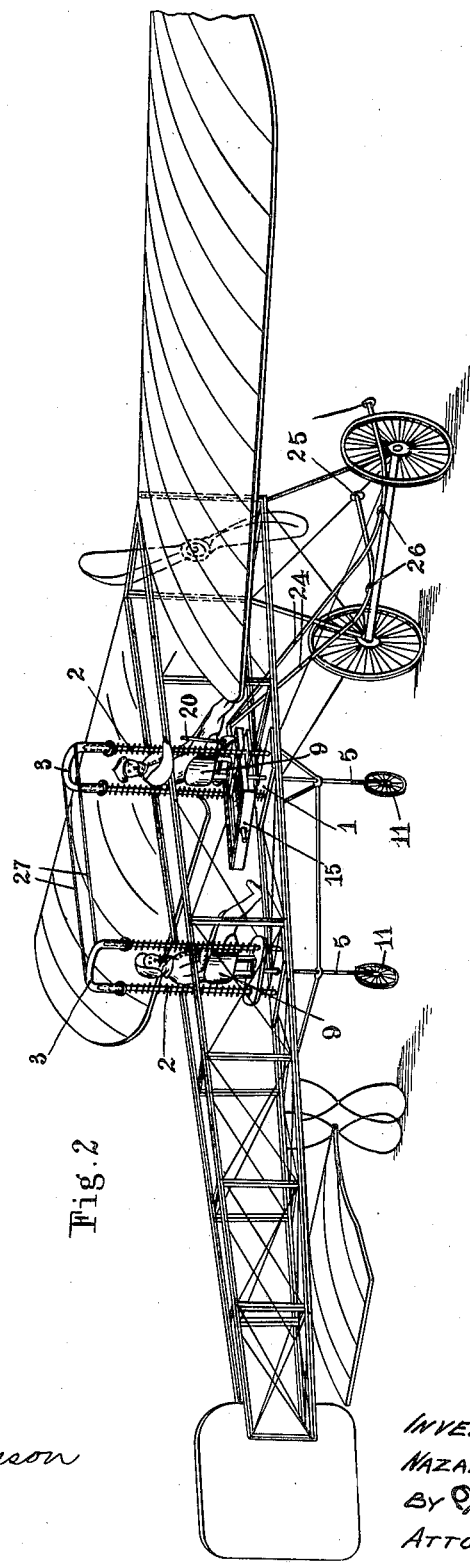

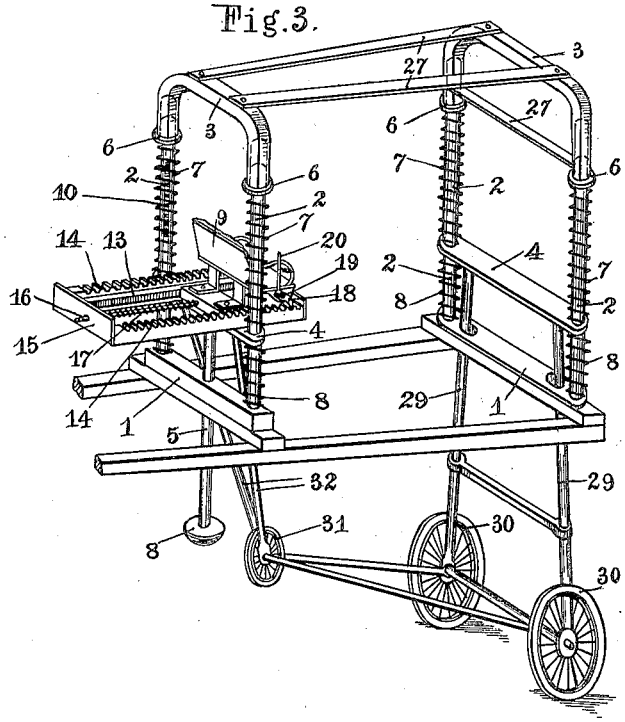

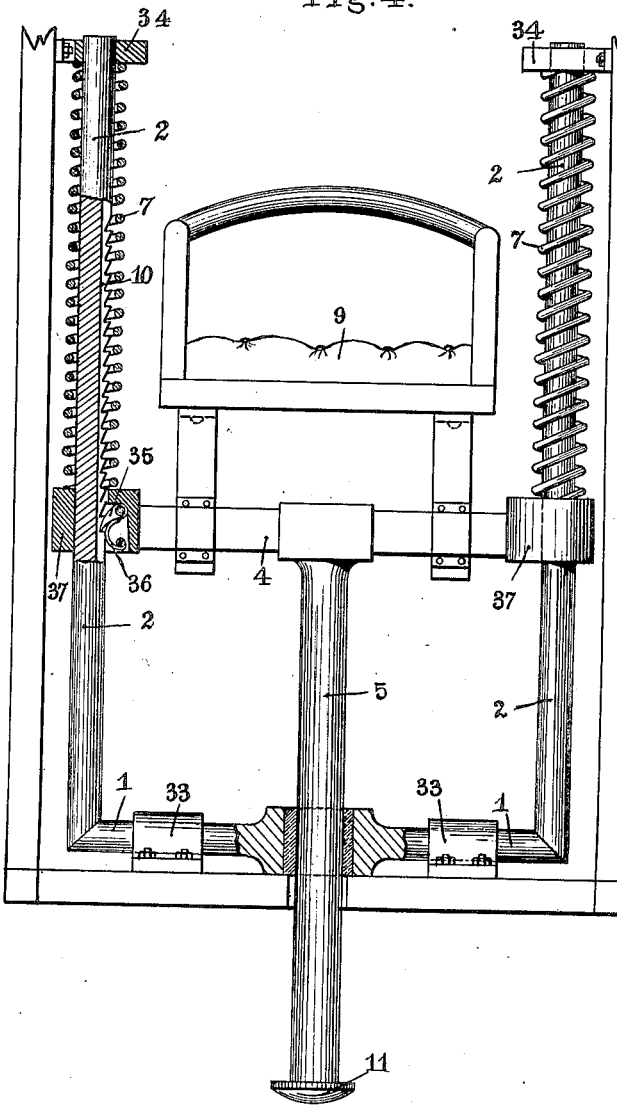
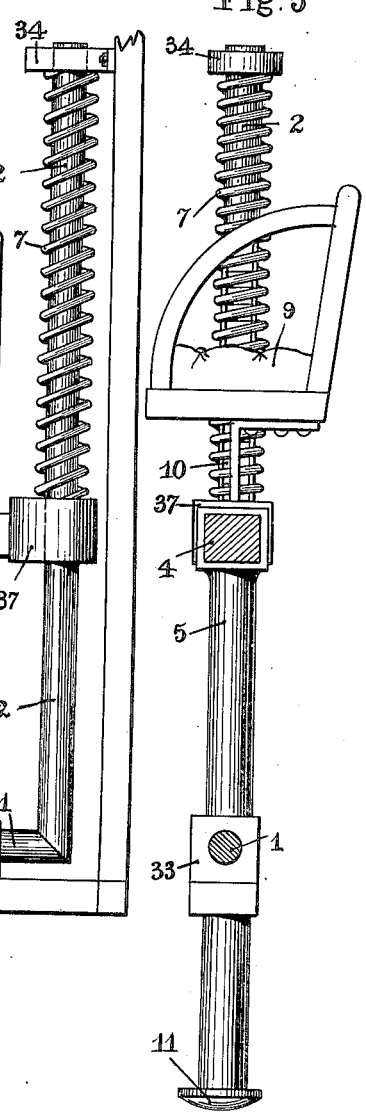

NAZAIRE LACROTTE, OF PARIS, FRANCE.

SAFETY DEVICE FOR AEROPLANES.

1,104,429.  Specification of Letters Patent.  Patented July 21, 1914.

Application filed September 9, 1913. Serial No. 788,950.

*To all whom it may concern:*

Be it known that I, NAZAIRE LACROTTE, a citizen of the Republic of France, residing at 136 Avenue Parmentier, Paris, in the Republic of France, have invented certain new and useful Improvements in Safety Devices for Aeroplanes, of which the following is a specification.

This invention relates to a device applied to the seats of the aviator and of the passengers in aeroplanes, intended to raise the seats and to deaden the shocks in case of a fall, sudden landing or capsizing of the aeroplane. This device comprises a U shape piece placed in the interior of the frame or body, the vertical portions of which serve as slides for a T shape piece, the horizontal arm of which supports the aviator's seat while the vertical arm that runs through the base of the U shape piece carries a buffer or a wheel which, in the case of a fall or abrupt landing, comes in contact with the ground and raises the aviator out of his dangerous position by compressing metallic or pneumatic shock-deadening springs, the seat being maintained in the raised position by pawls which engage in racks formed in the vertical portions of the U shape piece. Other compensating springs arranged under the seat and in the lower part of the vertical portions are intended to protect the aviators from being shaken up and down. The pilot's seat moreover is mounted on a rack slide which can move horizontally when there is a fall forward, without impeding the vertical movement. The arrangement is completed by a sort of dome arranged on the upper part of the guide rods or arms of the U shape pieces, this dome being intended to protect the aviators in case of the aeroplane capsizing.

In the accompanying drawing: Figure 1 is a perspective view of a complete apparatus comprising a seat for a passenger and a seat for the pilot. Fig. 2 represents an aeroplane furnished with the shock absorbing device. Fig. 3 represents a shock absorbing device for the pilot's seat only. Fig. 4 is a varied form of a shock absorbing device which has no horizontal movement. Fig. 5 is a side view.

Each shock absorbing device (Figs. 1 and 2) consists of a U shape piece which is fixed to the frame or body in any suitable manner. The base is formed by the board 1 which is firmly connected with two uprights 2, 2 on to the tops of which a bent piece 3 is fitted which is intended to absorb the shock and to protect the aviator in case of the capsizing of the aeroplane. On the rods or uprights 2 a horizontal piece 4 can slide, which is connected firmly with a lower vertical rod 5, and, between this piece and the shoulders 6 that form the lower part of the piece 3 springs 7 are interposed. Other compensating springs 8, placed below the seat 9 and connected with the piece 4 are intended to protect the aviators from being shaken up and down.

The uprights 2, which form a frame for the aviator, are furnished, toward the middle, with racks 10 in which pawls 10' engage when the seat 9 is moved vertically. The pawls 10' are arranged near the ends of the horizontal piece 4. At the lower end of the rod 5 a wheel or a buffer 11 is arranged, in order that in case of a fall or sudden landing, the apparatus while absorbing the shock may be able to raise the aviator out of his dangerous position.

The pilot's seat 9 rests on a piece 12, which slides in guides 13 formed on the inner sides of the racks 14 which are fixed to the horizontal piece 4. The two racks are connected with one another by a cross piece 15 in which a rod 16 freely moves that is fixed to the piece 12 which supports the seat 9. This piece 16 is furnished with a spring 17 that bears on the one hand on the cross piece 15 and, on the other hand on the piece 12.

Two pawls 18 mounted on the same shaft on the sides of the seat 9 are intended to maintain the seat in a suitable place, when the seat recoils. To the right of the pilot a lever 20 is placed for raising the two pawls and enabling the seat to return to its first position under the action of the spring 17. In order to maintain the pawls in engagement with the racks, a spring 21 may be arranged which is fixed to the seat 9 and to the upper part of the lever 20. The lever 20 and consequently the seat 9 can thus be fixed for the purpose of preventing the recoil of the seat while the aeroplane is ascending. For this purpose a locking device of any kind, a pin 22 for example may be employed (Fig. 1). The pieces 1 are provided with a ring 23 furnished with balls which are intended to prevent jamming and to enable the rods 5 to slide freely.

In order that it may be possible for the aviator to recede automatically as far as possible when the aeroplane descends and comes with the front part on to the ground, the pilot's seat 9 is connected with a fork 24 the ends of which are furnished with two buffers 25 which are arranged lower than and in front of the propeller. The arms 24 of the fork are engaged and can slide freely in rings 26 borne by the axle of the landing frame. The bent pieces 3 are connected together by transoms or cross bars 27 or by any other means capable of insuring satisfactory working. The pieces 3 are connected with the rods 2 by head pieces the diameter of which is slightly greater than that of the rods 2. These head pieces are inserted in the tubes 3 and the shoulders 6 bear under the pressure of the springs 7 against the lower part of the heads 28. The result of this arrangement is that the pieces 3 can actuate the spring 7 in case the aeroplane capsizes, while these same springs cannot force out the pieces 3 which are secured by the head pieces 28. Thus these pieces remain fixed when the springs 7 are compressed through the raising of the seat.

The action of the shock absorber is as follows: In the case of an ordinary landing, when the apparatus comes in contact with the ground, only the wheels of the landing train act. In the case of a sudden landing the wheels 11 fixed on the ends of the rods 5 are intended when coming in turn in contact with the ground, to raise the seats 9, the occupants of which owing to the compensating springs 8 placed below the seats will not experience any shock. In the case of a more violent shock or a fall, the seats will ascend and take hold of the racks 10, maintaining the aviators in the air, thus preventing them from being crushed by the wreckage of the apparatus. The pieces 3 in the form of a dome, joined together by the transoms 27 are intended, by acting on the springs 7 to absorb the shock and to protect the aviator in case the aeroplane capsizes. The pilot's seat 9, mounted on the rack slide enables the aviator to recede from his steering wheel when the apparatus comes slanting downward in front on to the ground. This receding is in fact more automatic through the buffers 25 which, in touching the ground, cause the arms of the fork 24 to slide in the rings 26, the effect of which is to put back the pilot's seat and at the same time to raise it.

In the arrangement shown in Fig. 3 which comprises only a pilot's seat that moves vertically and horizontally the landing train is firmly connected with two rods 29 at the ends of which the wheels 30 are placed. These rods slide in the pieces 1 and are fixed to the horizontal piece 4. The landing train is provided at the back with a wheel 31 of small diameter which raises the seat 9 through the medium of the rods 32. When the apparatus comes in contact with the ground in the case of an ordinary landing only the wheels 30 act on the piece 4, which slightly compresses the spring 7. In the case of a sudden landing the wheels 30 compress the springs 7 more powerfully, the back wheel 31, the diameter of which is smaller, comes in contact with the ground and acts on the springs 7 through the medium of the rods 32 raising the pilot's seat, which consequently undergoes no shock. The buffer 8 fixed on the rod 5, arranged below the seat is intended to absorb violent shock by raising the seat which engages with the racks 10 should the wheels 30 and 31 give way, the aviator being thus maintained in the air.

The shock absorbing device shown in Figs. 4 and 5 is a simplified apparatus with vertical movement. It consists of a base piece 1 fixed to the body or frame by clips 33, and firmly connected with two vertical arms 2 secured to the body or frame by clips 34. The arms 2 are provided with racks 10, in engagement with each of which is a pawl 35, which is under the influence of a spring 36, situated in the guides 37 placed at the ends of the piece 4 bearing the rod 5 provided with the buffer 11 which comes in contact with the ground. The springs 7 are arranged between the guides 37 and the upper clips 34. A number of shock absorbers, beyond those provided for the seats of the pilot or of the passenger may be placed at any points in the aeroplane, in order to protect the various parts, the motor for instance. The shock absorbers may vary in form and power according to the spot where they are placed. They may be furnished with one or more pieces 4 with rods 5 and be connected together by transoms 27 or other suitable means capable of insuring satisfactory working. The springs employed may be metallic springs, india-rubber springs, pneumatic springs, etc. The single spiral springs may be replaced by a number of equally powerful springs of the same diameter or of different diameter and power arranged on the same rod. Plate springs, similar to those employed for the suspension of carriages may likewise be employed. Pivot joints placed at the points of junction of the pieces may also be included in the construction.

It is to be understood that any modifications may be effected in the construction without departing from the purpose of the invention, the drawings of the apparatus being intended to show the working.

Claims.

1. A shock absorber serving at the same time as a device for raising the seats of the pilot and of the passengers in an aeroplane, comprising in combination, two horizontal cross bars fixed to the frame of the aeroplane; four vertical cylindrical rods provided with head pieces; a frame in the shape of a dome supported on these head pieces; seat supporting means each guided on two vertical rods; a rod fixed to the lower part of the seat supporting means, provided at its other end with a shock absorbing means; shock absorbing means mounted above the seat supporter; balancing springs mounted underneath the seat supporter; racks cut into the vertical rods; pawls connected with the seat supporters and engaging with the teeth of the racks when the seats rise; and a seat for the pilot capable of vertical and horizontal displacement.

2. A shock absorber serving at the same time as a device for raising the seats of aeroplanes comprising in combination, two horizontal cross bars fixed to the frame of the aeroplane; four vertical rods; a frame in the shape of a dome; two seat supporters; compensating springs; racks carried by the vertical rods; a seat for the pilot displaceable horizontally and vertically; a horizontal toothed slide for the horizontal displacement; pawls carried by the seat and engaging with the racks; a forked piece fixed in front of the pilot seat; rings carried by the landing gear in which the arms of the forked piece can slide; and buffers provided at the ends of the arms of the fork which come in contact with the earth when the aeroplane falls down and cause the seat of the aviator to move backward and upward.

3. A shock absorber serving at the same time as a device for raising the seats of aeroplanes comprising, two horizontal cross bars fixed to the frame of the aeroplane; four vertical rods; a frame in the shape of a dome mounted upon the upper ends of the vertical rods and capable of sliding thereon without becoming separated therefrom by the compression of shock absorbing springs mounted upon the vertical rods, to protect the aviator in the case of capsizing and compensating springs placed underneath the seat at the lower end of the vertical rods.

4. A shock absorber serving at the same time as a device for raising aeroplane seats, comprising in combination, two horizontal cross bars fixed to the frame of the aeroplanes; a frame in the shape of a dome, a seat supporter allowing a horizontal and vertical displacement; rods connected with the seat supporter; a shock absorbing wheel carried by the rods back of the landing gear; and a buffer mounted back of that wheel and at a higher level causing the seat to hook with the teeth of the vertical bar in the case of abrupt landing.

5. A shock absorber serving at the same time as a device for raising seats of aeroplanes, said shock absorber comprising in combination with the frame of the aeroplane; front and rear horizontal cross-bars fixed to the frame of the aeroplane; a pair of front vertical rods mounted on said front bar; a pair of rear vertical rods mounted on said rear bar; a frame in the shape of a dome mounted on said rods; a seat supporter guided on the rear ends; shock absorbing springs on the rear rods and pressing on the seat supporter; a rod fixed to the lower part of the seat supporter; a sliding plate guided on the front vertical rods; and rods connecting the sliding plate with the landing gear of the aeroplane, in order to absorb the shocks of an ordinary landing.

In testimony whereof I affix my signature in presence of two witnesses.

NAZAIRE LACROTTE.

Witnesses:
 EDMOND SECOUTIERIER,
 HANSON C. COXE.